UNITED STATES PATENT OFFICE.

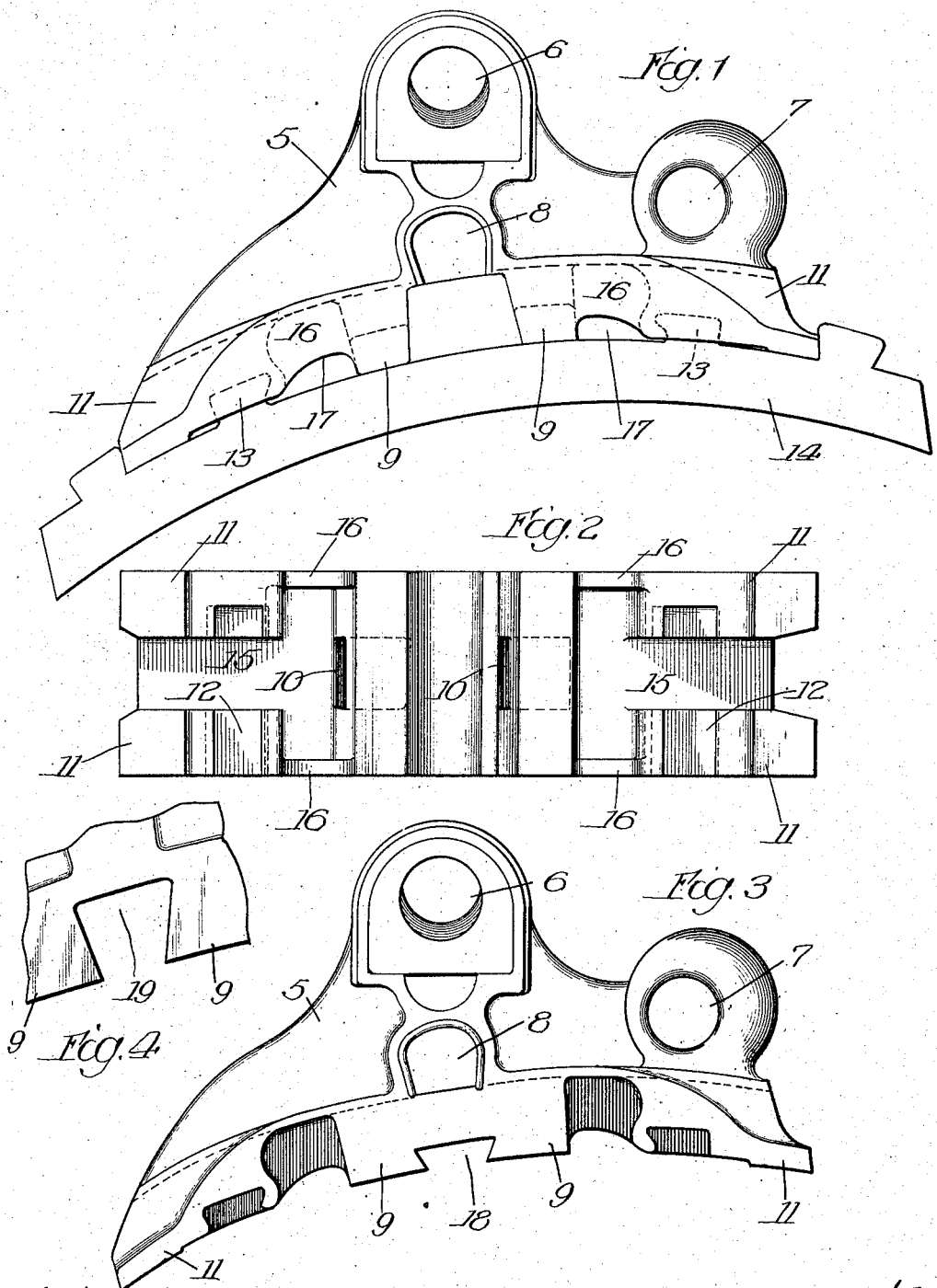

CHARLES W. ARMBRUST, OF CRYSTAL LAKE, ILLINOIS, ASSIGNOR OF ONE-HALF TO (MRS.) HARRIET W. ARMBRUST, OF NORTH CRYSTAL LAKE, ILLINOIS.

BRAKE-HEAD.

1,027,581.  Specification of Letters Patent.  Patented May 28, 1912.

Application filed May 29, 1911. Serial No. 630,147.

*To all whom it may concern:*

Be it known that I, CHARLES W. ARMBRUST, a citizen of the United States, residing at Crystal Lake, in the county of McHenry and State of Illinois, have invented certain new and useful Improvements in Brake-Heads, of which the following is a specification.

This invention relates to brake heads and aims to produce a device of this character which will meet all the M. C. B. requirements and will be so constructed that any of the well known types of brake shoes, solid or interlocking, may be attached thereto, and will also be particularly adapted for use with my improved interlocking brake shoe which will form the subject matter of another application.

My improved brake head is designed to be as light as is consistent with the strength required and has provisions for the attachment thereto of a brake shoe by means of the ordinary locking key, or without the employment of the key when used in connection with interlocking shoes constructed to interlock therewith.

The invention will be best understood by reference to the following description when taken in connection with the accompanying drawings illustrating preferred embodiments thereof.

On the drawings—Figure 1 is a side elevation of one form of my improved brake head with an interlocking shoe attached thereto. Fig. 2 is a face view of the brake head with the shoe removed. Fig. 3 is a side elevation of another form of brake head; and Fig. 4 is a fragmentary elevation of another form of brake head.

Referring to the drawings 5 designates generally the body of the brake head provided with the brake beam bearing 6, the auxiliary hanger opening 7 and the hanger opening 8. The attaching prongs 9 project downwardly on either side of the truss bearing and are provided with keyway openings 10 to receive the usual attaching key. The end prongs 11 have a longer flat under bearing face than is customary with the ordinary type of brake head, and each is provided on its lower face with a transversely extending locking recess 12 adapted to receive the locking lugs 13 on an interlocking brake shoe 14. One or more of the side walls of the recesses 12 are undercut as shown in Fig. 1, and said recesses are opened at one end to permit of the insertion of the locking lugs, while the opposite end is closed to prevent lateral displacement of the shoe in that direction. The locking key is not necessary when shoes of the interlocking type, such as are indicated by 14, are employed, and when the locking key is not used the locking lugs 13 may be depended upon to hold the shoe to the brake head.

The back of the brake head is made in the form of an integral web which connects the tops of the attaching prongs with the tops of each of the end prongs, and the end prongs are spaced apart to provide a recess or channel 15 therebetween to permit of the insertion of the locking key when required, and also to receive the end guide lugs of a shoe if that type of shoe be employed. In order to strengthen the end prongs, I provide flanges 16 constructed integrally with the back web and with the attaching prongs and end prongs, and these flanges are adapted to add materially to the strength and rigidity of the construction as a whole. In order that the brake head may be adapted for use with a brake shoe employing the usual spacing or guide ribs, the lower portions of the flanges 16 are cut away as indicated at 17 in Fig. 1. This type of brake head may be employed with any of the well known types of brake shoes provided with the usual end guide and thrust lugs and with a central attaching lug which may be either formed integrally therewith or detachably therefrom, and when the shoe is not equipped with locking lugs adapted to engage in the locking recesses 12, a locking or attaching key may be inserted through the keyway receiving openings 10 and through the keyway opening in the attaching lug. When, however, the interlocking type of shoe disclosed in Fig. 1 is employed, the locking or attaching key may be dispensed with and the locking lugs 13 may be relied upon to securely fasten the shoe to the head.

In the form shown in Fig. 3, the attaching prongs 9 are cast integral and the space between them is nearly filled with metal. An undercut locking recess 18 is, however, provided to receive the locking stud with which some types of shoes are equipped. This locking stud is ordinarily undercut for interlocking engagement with a detachable attaching lug and when this attaching lug is removed the shoe may be secured to the brake head and the central portion thereof locked to the head by means of the interlocking engagement between the attaching stud and the side walls of the locking recesses 18. In this type of brake head the flanges 16 on one side of the shoe may be omitted, as shown, to accommodate a higher spacing and guiding lug, if desired. Instead of being provided with an attaching stud adapted to receive a detachable attaching lug, some types of shoes are equipped with an integral attaching lug provided with undercut walls. In order to accommodate this type of shoe, the recess 18 shown in Fig. 3 may be made in the form indicated at 19 in Fig. 4, in which instance the undercut walls of the attaching lug will coöperate with the inclined walls of the recess 19 to lock the shoe to the brake head.

While I have shown and described preferred embodiments of my invention, it will be obvious that various changes in the size, shape and proportion of the various parts may be resorted to without departing from the spirit or sacrificing any of the material advantages of the invention.

I claim:

1. A brake head comprising an attaching prong and a plurality of end prongs at each end of the head, said end prongs being provided with recesses to receive the locking lugs of a brake shoe.

2. A brake head comprising centrally disposed attaching prongs and end prongs spaced to receive the end guide lugs of a shoe, said end prongs being provided with transversely extending recesses adapted to receive and interlockingly engage with the locking lugs of a brake shoe.

3. A brake head comprising centrally disposed attaching prongs and end lugs spaced apart, said end lugs being provided with transversely extending recesses closed at one end, said recesses being adapted to receive and interlockingly engage with the locking lugs of a brake shoe.

4. A brake head comprising attaching prongs and end prongs provided with locking recesses, and having a web integrally connecting the tops of said attaching prongs and end prongs, a space being provided between said end prongs beneath the web for the insertion of an attaching key.

5. A brake head comprising attaching prongs and a pair of end prongs at each end of the head, and a web extending over the back of the head and integrally connecting said attaching prongs and end prongs, the individual end prongs of each pair being spaced apart and provided with recesses to receive and interlockingly engage with the locking lugs of a brake shoe.

6. A brake head comprising attaching prongs and end prongs spaced apart to provide recesses therebetween for the reception of spacing lugs, and flanges connecting said attaching prongs and end prongs to unite and strengthen the same, said flanges being cut away at their lower edges to only partially close the ends of said recesses whereby to permit the spacing lugs of a brake shoe to slide across the face of the brake head.

7. A brake head comprising a solid back having attaching prongs and end prongs depending therefrom, flanges depending from said back and integrally connecting said attaching prongs and end prongs, said attaching prongs being provided with keyway openings and the end prongs being spaced apart to provide recesses alined with said keyway openings.

8. A brake head comprising attaching prongs adapted to receive the attaching lug of a brake shoe therebetween, and end prongs spaced apart transversely of the head and provided with transversely extending recesses adapted to receive the interlocking lugs of a brake shoe.

9. A brake head provided at each end with a pair of separated end prongs, each pair having a locking recess extending transversely thereof to receive the locking lugs of a brake shoe.

10. A brake head comprising attaching prongs and longitudinally disposed and transversely spaced apart end prongs provided with interlocking recesses adapted to receive and interlockingly engage with the locking lugs of a brake shoe.

11. A brake head having attaching prongs and parallel longitudinally disposed end prongs shaped to interlockingly engage with the locking lugs of a brake shoe.

12. A brake head comprising attaching prongs and end prongs, said end prongs being provided with locking recesses open at one end and closed at the other, and said attaching prongs being shaped to engage with the attaching stud of a brake shoe.

13. A brake head comprising end prongs and attaching prongs, said end prongs having recesses closed at one side of the shoe and open at the other to receive the locking lugs of a brake shoe and said attaching prongs having provisions for interlocking engagement with the attaching lug of said brake shoe.

14. A brake head comprising end prongs and attaching prongs, said end prongs being spaced apart longitudinally of the head and being provided with locking recesses, said attaching prongs being undercut for interlocking engagement with the attaching lug of a brake shoe.

15. A brake head comprising end prongs spaced apart transversely of the head and attaching prongs, said attaching prongs having provisions for sliding interlocking engagement with the attaching lug of a brake shoe.

CHARLES W. ARMBRUST.

Witnesses:
 IRA J. WILSON,
 G. E. HOLMES.

---

Copies of this patent may be obtained for five cents each by addressing the "Commissioner of Patents, Washington, D. C."